April 19, 1966 P. E. CARY 3,247,353
HEAT TREATING APPARATUS AND PROCESS FOR CRANKSHAFTS
Filed Dec. 26, 1962 4 Sheets-Sheet 4

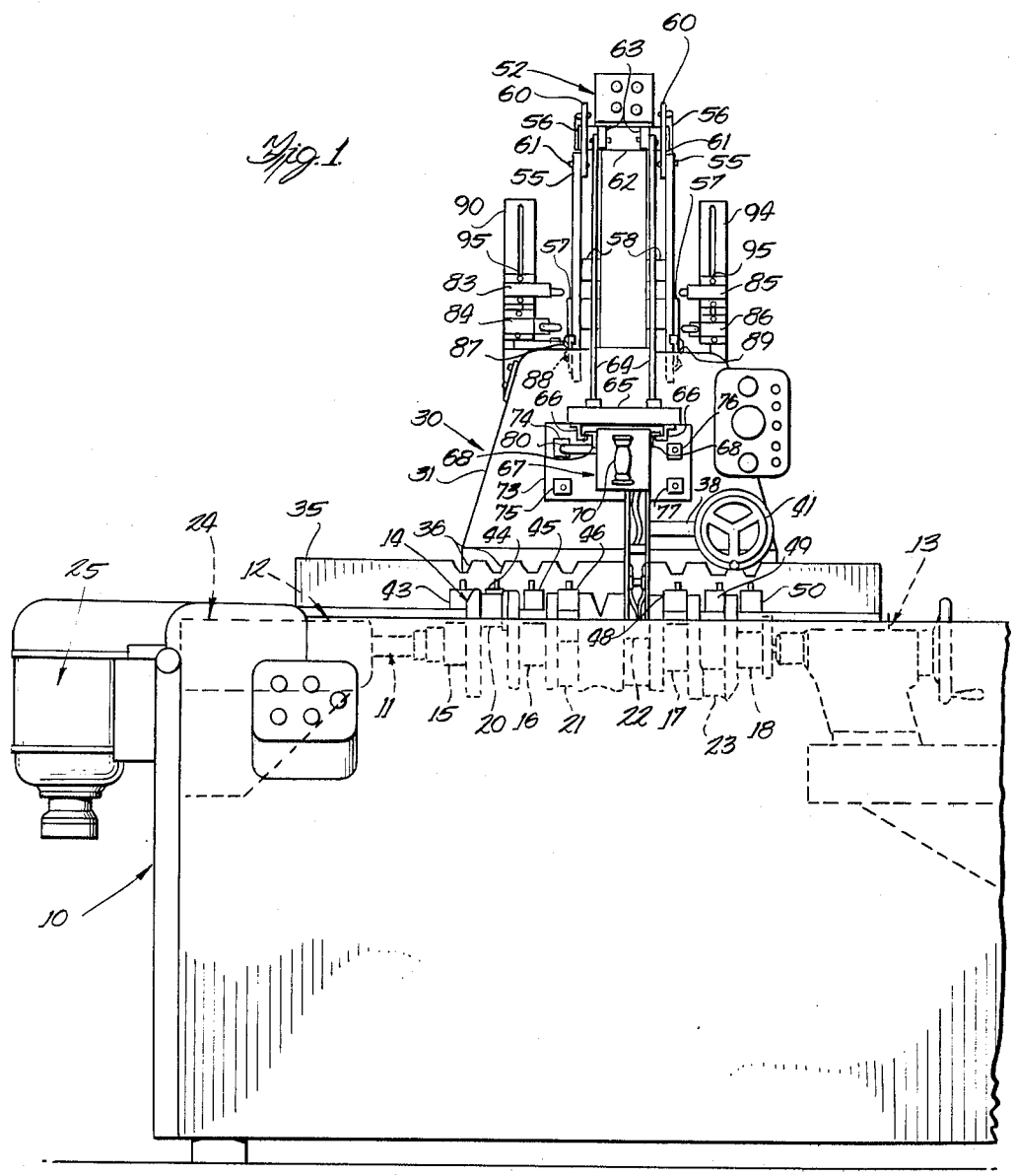

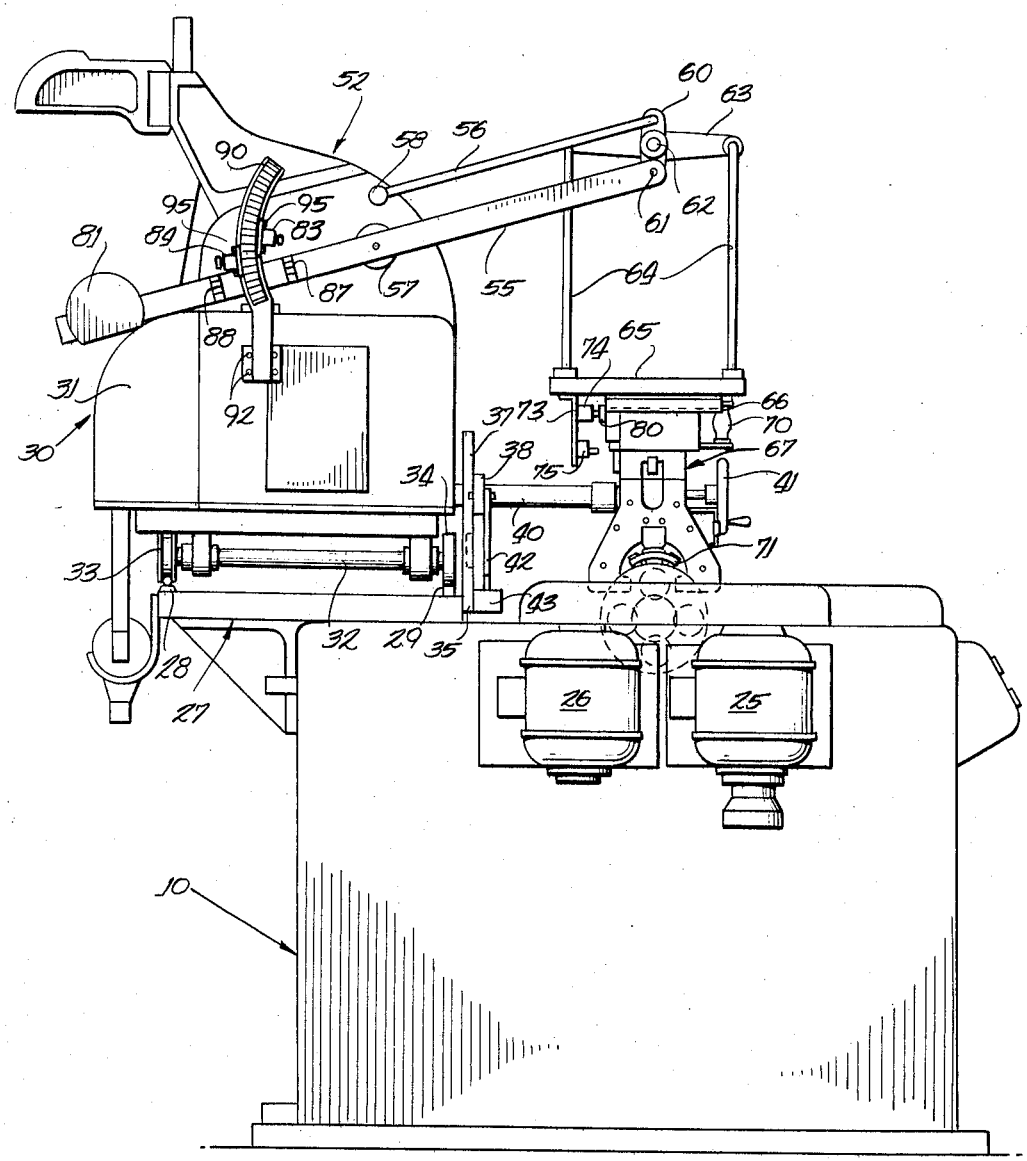

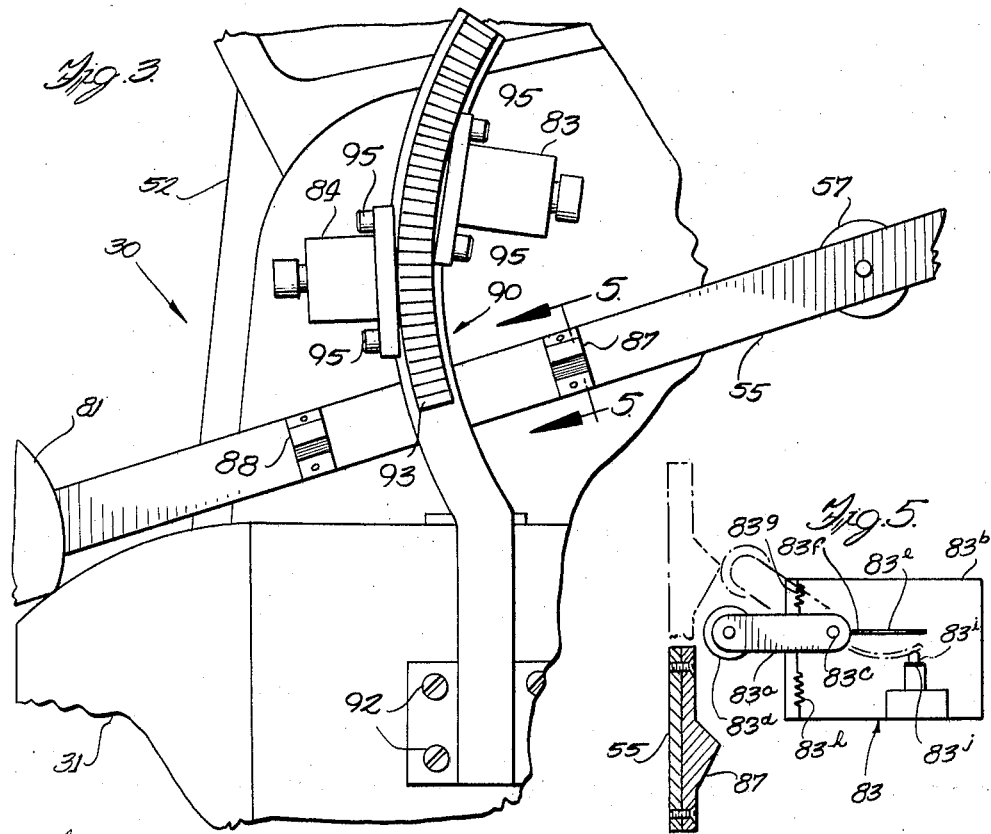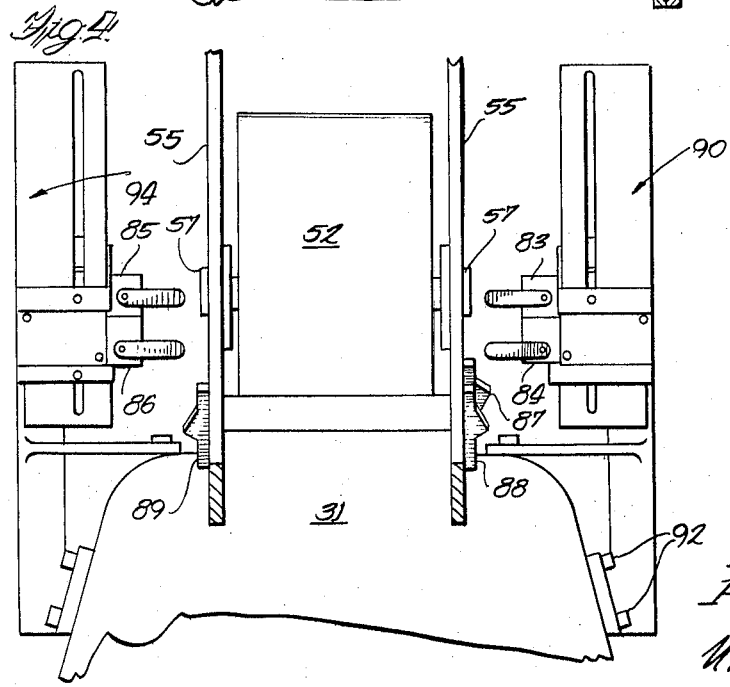

Inventor
Philip E. Cary
Attorney

United States Patent Office 3,247,353
Patented Apr. 19, 1966

3,247,353
HEAT TREATING APPARATUS AND PROCESS FOR CRANKSHAFTS
Philip E. Cary, Joliet, Ill., assignor to International Harvester Company, Chicago, Ill., a corporation of New Jersey
Filed Dec. 26, 1962, Ser. No. 247,243
17 Claims. (Cl. 219—10.57)

This invention is generally concerned with heat treating apparatus and processes for hardening crankshafts, and more particularly to a novel apparatus and process for inductively hardening the bearings and fillets of a crankshaft or the like.

The primary object of the present invention is to provide a novel apparatus and process for inductively heating the indvidual bearings of a crankshaft to effectively surface-harden the bearings.

Another object is to provide a novel apparatus and process for inductively heating the individual bearings of a crankshaft using substantially higher inductively produced temperatures in the surface of the bearings than heretofore believed practical with commercial induction hardening machines.

It is still another object to provide a novel apparatus and process according to the preceding objects wherein the temperature gradient from the surface of the bearings to the core is extremely sharp and substantially confined to a uniform skin depth circumferentially of the bearings so that distortion of the crankshaft due to the heating of the core thereof is substantially avoided.

It is a further object to provide a novel apparatus and process according to the preceding paragraph wherein the possibility of overheating in any portion of the surface of the bearings including the fillets thereof is substantially avoided.

It is still another object to provide a novel apparatus and process according to the preceding paragraphs wherein the fillets at each end of the bearings may also be inductively heated for hardening thereof without producing any substantial deeper heating in the circumferential center area of the bearings.

It is still another object to provide a novel apparatus and process according to the preceding paragraphs wherein the circumferential heating of the pin bearings and the fillets thereof is appropriately varied to provide substantially uniform depth of heating circumferentially of the pin bearings and fillets irrespective of the variance in mass of the crankshaft at each end of the pin bearings.

It is still another object to provide a novel apparatus according to the preceding paragraph in which no manual adjustment of the apparatus is necessary to change the power delivered to the inductors when the heating operation is moved from a pin bearing to a main bearing or from a main bearing to a pin bearing.

It is a further object to provide a novel apparatus for presently used commercial production machines for the inductive heating and hardening of the bearings and fillets of a crankshaft in which the operation of the apparatus and process is performed with a minimum of necessary skill on the part of the operator to produce heating which is circumferentially uniform in depth in each bearing irrespective of which particular bearing of a crankshaft is being heated at any one time.

It is a further object to provide a novel apparatus according to any of the preceding paragraphs in which electrical control circuits are provided for preventing the accidental use of the wrong inductor for any one bearing.

It is still another object to provide a novel apparatus according to any of the preceding paragraphs in which electrical control circuits are provided for automatically controlling the energization and deenergization of the inductor and for varying the power delivered to the inductor by means operating responsive to the translation of the inductor toward and away from the axis of rotation of the crankshaft during rotation of the crankshaft.

It is still another object to provide a novel apparatus and process for inductively heating any one bearing of a crankshaft in which the revolutions or translations of a pin bearing of the crankshaft relative to the axis of rotation of the crankshaft are used to directly operate or control the power delivered to an inductor which is heating either the same pin bearing, a different pin bearing, or a main bearing.

Other objects and features of the invention will be apparent upon a perusal of the following specification and drawings in which:

FIGURE 1 is a front elevational view of a crankshaft heating apparatus constructed according to the invention;

FIGURE 2 is an end elevational view of the structure shown in FIGURE 1;

FIGURE 3 is an enlarged view of a portion of the structure shown in FIGURE 2;

FIGURE 4 is a rear elevational view of the structure shown in FIGURE 3;

FIGURE 5 is an enlarged view of a portion of the structure shown in FIGURE 4.

Figure 6:
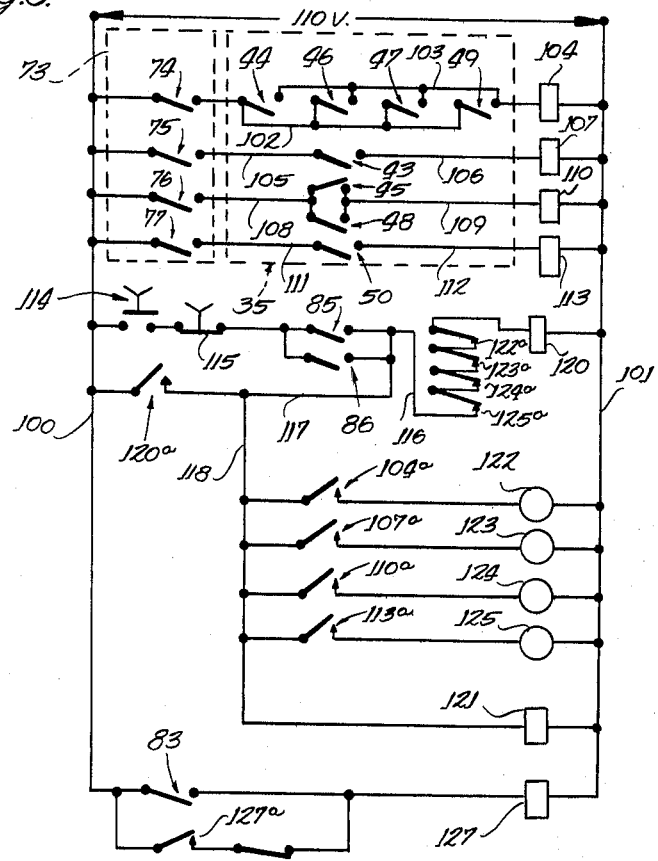
FIGURES 6 and 7 are electrical diagrams of the various circuits for the apparatus of FIGURES 1 through 5.

The present embodiment is the preferred embodiment, but it is to be understood that changes can be made in the present embodiment by one skilled in the art without departing from the spirit and scope of the present invention.

Generally, the novel apparatus of the present invention may be easily applied to a heat treating apparatus of the type shown in Patent No. 2,787,566, to G. Seulen et al., dated April 2, 1957. The novel process of the invention may be performed by many different types of apparatus. The novel process of the invention solves a number of problems which have long existed in the art of heat treating of crankshafts or the like. In the process, the crankshaft is first rotated at a certain rotational speed, and a deenergized inductor is applied to the first bearing of the crankshaft to be heated. An inductor is selected which will only heat a relatively small incremental portion of the total circumference of the bearing. Relatively high power is delivered to the inductor to cause relatively rapid heating of substantially a skin depth of the portion of the bearing beneath the inductor, and the rotational speed of the crankshaft and power applied to the inductor is correlated to the degree of heating of the crankshaft so that at the trailing edge of the inductor, the temperature of the bearing will be immediately below the temperature which would cause overheating in the surface of the bearing. Overheating may be defined as the substantial occurrence of any one of three conditions in the surface of the bearing, grain growth, hairline cracks, or segregation of the structural constituents of the steel. It has been found that with the instant process, a sharp temperature gradient appears from the surface of the bearing inwardly thereof with substantially all of the heating occurring in a relatively shallow skin portion of the bearing. Thus very little heating occurs in the core of the bearing and as a result thereof, substantially no distortion of the crankshaft will appear. The process encompasses not only the heating of the journals of the bearing but also the fillets at each end of the bearing. The steps of the process further include varying the power applied to the inductor to compensate for the variance in mass of the crankshaft at the ends of the pin bearings thereof to provide substantially uniform depth of heating of the pin bearings about the circumference thereof. This varying of power to the inductor is directly controlled by the translations of a pin bearing of the crankshaft toward and away from the axis of rotation of the crankshaft.

The novel apparatus of the invention generally comprises a track-carried inductor carriage mounted on one longitudinal side of a quench tank. A crankshaft is rotatively carried in the upper end of the quench tank and above the quenching medium with the axis of rotation of the crankshaft positioned parallel to the axis along which the inductor assembly is movable. Certain indexing means are provided for insuring that the inductor carriage may be accurately successively positioned for the heating of the individual bearings of the crankshafts. The inductor carriage includes an inductor-carrying assembly which is pivotally carried from a parallelogram arrangement of a plurality of arms. Those arms extend rearwardly of the inductor carriage and their rearward ends are provided with counterweights to insure that the inductor engages a bearing under the influence of gravity with no greater force than is desired. From the foregoing it may be seen that the inductor-carrying assembly and the parallelogram of arms will remain substantially stationary when the inductor engages a main bearing while the crankshaft is rotating. Further, the inductor-carrying assembly will be moved upwardly and downwardly and the parallelogram of arms will pivot when the inductor engages a pin bearing while the crankshaft is rotating.

The lower portion of the inductor-carrying assembly is provided with means for receiving a manually inserted inductor. This enables an operator to change inductors for the different bearings of the crankshaft. A plurality of inductor selection switches are carried from the inductor-carrying assembly and positioned in a certain spaced apart relationship. Each of the different inductors which may be used is provided with an extending switch arm adapted to engage and operate one of the inductor selection switches when the inductor is inserted in the inductor-carrying assembly. The inductor selection switches are connected by certain circuits to cooperate with a plurality of switches associated with the inductor carriage indexing means to provide an arrangement which prevents the application of power to the inductor if the operator has inserted the wrong inductor for the particular bearing at which the inductor carriage is indexed. The present embodiment of the invention by way of example discloses the heat treating of a crankshaft having eight bearings, four main bearings and four pin bearings, and therefore, the indexing means is adapted to index the inductor carriage at any one of eight different stations. The present embodiment further contemplates that four different inductors are needed for the eight bearings of the crankshaft, certain of the inductors being used for more than one of the bearings, and therefore, four different inductor selection switches are provided.

Four other switches are important to the operation of the invention. These switches are carried in pairs on two quadrants which are secured one on each side of the inductor carriage and extend generally upwardly in planes parallel to the planes in which the rearward extending portions of the parallelogram arrangement of arms are moved when the inductor is riding on a pin bearing of the crankshaft to move the inductor-carrying assembly upwardly and downwardly. The rearwardly extending portions of the parallelogram arrangement of arms carry cam surfaces for operating the four switches. The pair of switches on one side of the inductor carriage is provided for starting and stopping a period of reduced power to the inductor, and the pair of switches on the other side of the inductor carriage is provided for initiating the application of power to the inductor. It will be understood that when the inductor engages a main bearing of the crankshaft, no operation of the four switches takes place since the parallelogram arrangement of arms does not pivot when the inductor engages a main bearing. The four switches are primarily provided for use in the heat treating cycle for the pin bearings, when the parallelogram arrangement of arms is pivoted as the crankshaft rotates. The four switches provide that in the heating of a pin bearing, the inductor will only be energized when the pin bearing reaches a certain rotational position, and the power to the inductor will be at a certain high level for a certain period during each revolution of the crankshaft and at a certain lower level during the remainder of each revolution of the crankshaft. This arrangement has a marked advantage over prior known devices for the varying of power to an inductor arrangement for heating a pin bearing of a crankshaft because the control of the power level and the initiation of a heating cycle are made directly by the pin bearing through its upward and downward translations during the rotation of the crankshaft. This arrangement is positive and accurate in operation and the possibility of error is substantially removed. It is well known that because of the variance in mass of magnetically permeable crankshaft material at each end of a pin bearing circumferentially thereof, it is desirable to vary the power levels of the inductor in the heat treating of a pin bearing of a crankshaft. The exact operation of the four switches and of the circuits associated therewith will be described in detail below. Although the present embodiment discloses an arrangement wherein the power to the inductor is controlled by means operating responsive to vertical translations of the inductor assembly, the present invention contemplates arrangements wherein power to the inductor is controlled by means operating directly responsive to any translations of a pin bearing relative to the axis of rotation of the crankshaft. Those translations of a pin bearing may be used to not only control power to the translating bearing, but may control power to another pin bearing or a main bearing. Further, the means operating directly responsive to the translations of a pin bearing may be some means other than the inductor assembly.

In detail, a quench tank 10 is provided in the upper portion thereof with a spindle 11 extending from a headstock 12 and a tailstock 13. A crankshaft 14 is locked between the spindle 11 and the tailstock 13. The crankshaft 14 comprises four main bearings 15, 16, 17 and 18, and four pin bearings 20, 21, 22 and 23. The pin bearings are carried between a plurality of cheeks extending radially outwardly of the axis of the crankshaft 14 and at various angles to each other. The particularly described crankshaft 14 is by way of example, it being understood that any other type of crankshaft or the like may be used in the apparatus and process of the invention. The flat cylindrical portion of each bearing may be described as the journal thereof and the annular curved or corner portions at each end of a bearing may be designated the fillets thereof. The crankshaft 14 is formed of a magnetically permeable material which permits the bearings to be heated by hysteresis currents induced in the bearings by an inductor. It is well known that because of the variance in mass of the cheeks at each end of a pin bearing circumferentially thereof, any constant induced voltage which is applied circumferentially of a pin bearing results in substantially reduced heating in the semicyclindrical portion of the pin bearing toward the axis of rotation of the crankshaft. The inductive heating of a main bearing generally presents no such problem because the mass of the cheeks extending radially outwardly of a main bearing is generally circumferentially constant.

Power means 26 and gear box 24 are provided for the headstock 12 to provide for a constant speed rotation of the crankshaft 14 about the axis of rotation thereof. In one reduction-to-practice of the invention a rotational speed of the crankshaft 14 of 7 revolutions in 11½ seconds was used.

FIGURE 2 shows an element 26 which is used in the quenching process of the apparatus. The functions of those elements are not involved in the present invention.

The rearward longitudinal wall of the quench tank 10 is provided at the upper end thereof with a platform 27. The platform 27 is provided with a pair of spaced apart rails 28 and 29 which are disposed parallel to the axis of rotation of the crankshaft 14. The rails 28 and 29 carry the inductor carriage which is indicated generally at 30. The base of the inductor carriage 30 comprises a power equipment section 31. The underside of the base or power equipment section 31 of the inductor carriage 30 is provided with a pair of parallel spaced apart axles one of which is shown at 32 in FIGURE 2. A pair of wheels 33 and 34 is rotatively carried at each end of each axle 32. The wheels 33 ride on the track 28 and the wheels 34 ride on the track 29 to permit the inductor carriage 30 to be moved to any desired position longitudinally of the quench tank 10.

A detent plate 35 is secured to one longitudinal edge of the platform 27 to upstand therefrom. The detent plate 35 is provided with eight notches 36 in the upper edge thereof. The eight notches 36 are particularly positioned in the detent plate 35 with each notch 36 centered on one of the bearings of the crankshaft 14. A pawl 37 is provided for engagement with any one of the detent notches 36 in the detent plate 35. The pawl 37 is pivotally carried and vertically positioned on one end of an arm 38. The other end of the arm 38 is secured to extend radially of a shaft 40. The shaft 40 is secured to the section 31 of the inductor carriage 30 and extends perpendicularly therefrom over the crankshaft 14. The other end of the shaft 40 is provided with a handwheel 41. When the handwheel 41 is rotated in one direction the arm 38 is pivoted to raise the pawl 37 upwardly and out of any one of the detent notches 36. A turning of the handwheel 41 in the opposite direction causes the pawl 37 to be moved downwardly into appropriate engagement with one of the detent notches 36 when the inductor carriage 30 is properly positioned relative to any selected one of the detent notches 36 to accurately index and align the inductor carriage 30 for proper engagement of the inductor carried by the inductor carriage 30 with any selected one of the bearings of the crankshaft 14. The pawl 37 is not shown in FIGURE 1 as it is disposed directly behind the inductor shown therein. It may be noted that in FIGURE 1, the inductor carriage 30 is aligned for accurate engagement of the inductor carried thereby onto pin bearing 22 of the crankshaft 14.

In addition to the pawl 37, the extending end of the arm 38 carries a depending switch actuator 42. The switch actuator 42 is adapted at its lower end to engage and operate any one of eight switches 43, 44, 45, 46, 47, 48, 49 and 50 when the inductor carriage 30 is indexed with the pawl 37 in one of the notches 36 of the detent plate 35. The switch 47 is not shown in FIGURE 1 because it is positioned immediately behind the inductor shown in FIGURE 1. Thus it may be seen that in each indexed position of the inductor carriage 30 the inductor is aligned for accurate engagement with a bearing of the crankshaft 14 and one of the switches 43 through 50 is operated.

A housing member 52 is carried on the upper side of the base member 31 of the inductor carriage 30 to upstand therefrom. A parallelogram arrangement of arms is pivotally carried on the housing 52. The parallelogram arrangement of arms comprises a pair of arms 55 and a pair of arms 56. The arms 55 are disposed one on each side of the housing 52 and each arm 55 is pivotally carried intermediate its ends on a pin assembly 57. The arms 56 are disposed one on each side of the housing 52 and one end of each arm is pivotally connected to the housing 52 at a position above pin assembly 57 by a pin assembly 58. The other end of arms 56 is pivotally connected to one end of two links 60. The other end of each of the links 60 is pivotally connected to the forward end of the arms 55 by pins 61. The pivot axes of the arms 55 and 56 about pin means 57 and 58 and to the links 60 are such that a pair of spaced apart parallelograms are defined. A tubular member 62 is rigidly connected to the links 60 between the pivotal connections of the arms 55 and 56 to the links 60. The tubular member 62 is rigidly connected to a pair of cross members 63 which are secured intermediate their ends on the tubular member 62 and in a spaced apart relationship to each other. Four links 64 are also provided. One end of each of the links 64 is pivotally connected to one end of one of the cross members 63. The links 64 are positioned to depend from the cross members 63 and the links 64 are connected at their lower ends to a support plate 65. The underside of the support plate 65 is provided with a pair of spaced apart channel members 66. The channel members 66 are adapted to receive an inductor assembly 67. The upper side walls of the inductor assembly 67 are provided with channel members 68 which are slidably received in the channel members 66 of the support plate 65. The inductor assembly 67 is inserted and removed from the support plate 65 by a handle 70. The mechanical insertion of the inductor assembly 67 is attended by an electrical connection of the inductor assembly to conductors (not shown) carried by the support plate 65. The inductor assembly 67 may be of any suitable type known in the art having an induction coil which only engages a relatively small circumferential portion of a bearing of the crankshaft 14. In the inductor assembly 67, the induction coil is shown at 71. In one reduction-to-practice of the invention, the induction coil 71 spanned a circumferential portion of the appropriate bearing of the crankshaft 14 equal to an angle of substantially 120°.

In addition to the inductor assembly 67, the support plate 65 also carries a depending plate 73 which is positioned rearwardly of the inductor assembly 67. Four switches 74, 75, 76 and 77 are carried on the forward side of the depending plate 73 in a certain spaced apart relationship to each other. The switches 74, 75, 76 and 77 are provided for the purpose of insuring that the operator has inserted the correct inductor assembly 67 in the channels 66 for the specific bearing of the crankshaft 14 which is to be heat treated. The manner in which the switches 74, 75, 76 and 77 operate to perform the noted functions will be described below.

Each of the four different inductor assemblies contemplated by the present embodiment of the invention is provided with an arm mounted on the rearward side thereof which is adapted to engage and operate one of the switches 74, 75, 76 and 77 when the inductor assembly is manually positioned in the channels 66 of the support plate 65. The inductor 67 shown in the drawing is provided with an arm 80 which, as shown in FIGURE 1, has operated the switch 74.

The weight of the inductor assembly 67 and its carrying assembly is counterbalanced by a pair of counterweights 81. Each of the counterweights 81 is carried on the rearward end of one of the arms 55 as may be seen in FIGURE 2.

The arms 55 in extending rearwardly of the pin assemblies 57 are further used to accurately control the power level and the initiation of the heating cycle for the heat treating of the pin bearings 20, 21, 22 and 23 of the crankshaft 14. This control of the heating of the pin bearings of the crankshaft 14 is provided by four switches 83, 84, 85 and 86 which are operated by three cam members 87, 88 and 89 carried on the arms 55. The arms 55 can function to control the heating of the pin bearings because the different pivoted positions that the arms 55 assume are directly related to the different relative positions between the inductor coil 71 and the circumference of a pin bearing of the crankshaft 14 during the rotation thereof. It may be seen from a consideration of FIGURE 2 that as the crankshaft 14 rotates, a pin bearing in engagement with the inductor assembly 67 will cause the inductor assembly 67 to be translated upwardly and downwardly as the crankshaft 14 rotates.

The switches 83 and 84 are adjustably secured to a rigid upstanding standard 90 secured on one side of the inductor carriage 30 by fasteners 92. The standard 90 is curved on the arc of a circle concentric to the axis of pivoting the arms 55. One side of the standard 90 is provided with a scale 93. The switches 85 and 86 are similarly mounted on a standard 94. The switches 83, 84, 85 and 86 are secured to the standards 90 and 94 by fasteners 95 projecting through slots formed longitudinally through the standards 90 and 94. In FIGURES 1, 2 and 3, the switches 83 and 85 are shown as carried on the forward side of the standards 90 and 94 with the switches 84 and 86 carried on the rearward side of the standards 90 and 94. In FIGURE 4, the switches 83 through 86 are shown as carried on the forward side of the standards 90 and 94. The switches 83 through 86 are adjustable on the standards 90 and 94 to any desired positions corresponding to any particular relative positions of any circumferential portion of a pin bearing of the crankshaft and the inductor coil 71. FIGURE 5 shows in a somewhat diagrammatic view the manner in which each of the switches 83 through 86 operates. As shown in FIGURE 5, a switch arm 83a is pivotally carried on the housing 83b by means of a pin 83c. The extending end of the switch arm 83a is provided with a roller assembly 83d. The armature of the switch is indicated at 83e and is rigidly secured at one end thereof to the switch arm 83a so that as the switch arm 83a is rotated, the armature 83e is also rotated. Conductor 83f is connected to armature 83e. The switch arm 83a is biased to the position shown in FIGURE 5 by a pair of springs 83g and 83h. In this position of the switch arm 83a, the extending end of the armature 83e is positioned adjacent a stationary contact 83i which is provided with a conductor 83j. When the switch arm 83a is moved in a clockwise direction as viewed in FIGURE 5 which represents a downward movement of the rear portion of the arm 55 carrying the cam surface 87, the armature 84e will engage contact 83i to complete an electrical circuit between conductors 83f and 83j. When the cam surface 87 is moved past the switch arm 83a, the springs 83g and 83h will return the switch arm 83a to the solid line position shown in FIGURE 5 breaking the circuit between conductors 83f and 83j. From the foregoing it may be seen that the operation of the switch 83 may be described as a pulsing operation. It is also apparent from the foregoing that no operation of switch 83 occurs when the rear portion of arm 55 is moved upwardly past the switch 83. When the switch arm 83a is moved in a counterclockwise direction as viewed in FIGURE 5, the armature 83e is merely moved further away from the stationary contact 83i. The other switches 84, 85, and 86 are constructed similarly to switch 83, except that switch 84 is normally closed. Thus it may be seen that each of the switches 83 through 86 are operated in one direction only and when operating, switches 83, 85 and 86 are momentarily closed in a pulsing operation while switch 84 is momentarily opened in a pulsing operation. Further, switch 84 is arranged to operate on the upward movement of the rear portion of arm 55. Switch 85 is arranged to operate on the downward movement of the rear portion of arm 55 while switch 86 operates on the upward movement thereof. It should be kept in mind that a downward movement of the rear portions of the arms 55 represents an upward movement of the inductor assembly 67.

The remaining undesignated parts shown in FIGURES 1 through 3 are concerned with the electrical circuits of the invention. None of the electrical circuits are shown in FIGURES 1 through 3 to avoid unnecessarily complicating the drawings. The complete electrical circuits for the operation of the invention are shown in FIGURES 6 and 7.

Figure 7:
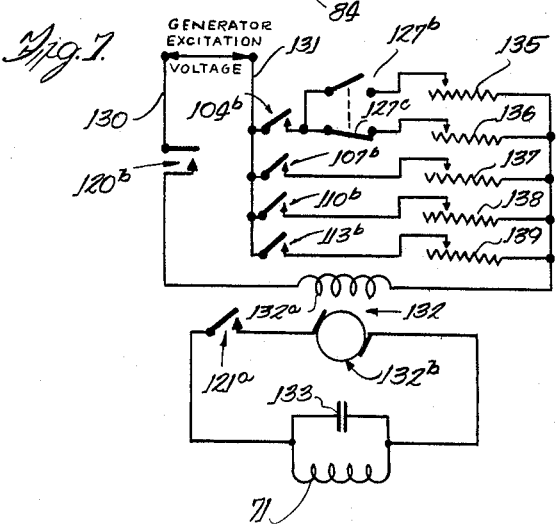

In the circuit diagram of FIGURE 6, the switches shown therein which are identical to previously described switches are designated with the same numerals. In FIGURE 6 the power source for the circuits is represented by the power conductors 100 and 101. The four indexing switches 44, 46, 47 and 49 for the four pin bearings 20, 21, 22 and 23 are all connected on one side thereof in parallel to a conductor 102. The other sides of the switches 44, 46, 47 and 49 are connected in parallel to a conductor 103. Conductor 102 is connected to one side of the switch 74, which is one of the inductor selection switches carried on the depending plate 73. The other side of switch 74 is connected to power conductor 100. Conductor 103 is connected to one side of the coil of a relay 104. The other side of the coil of relay 104 is connected to power conductor 101. Relay 104 is provided with two sets of normally open contacts, contacts 104a in FIGURE 6 and contacts 104b in FIGURE 7. From the foregoing it is apparent that all four pin bearings 20, 21, 22 and 23 use the same inductor assembly, and that inductor assembly, when inserted in the channels 66 of the support plate 65 will close switch 74. It may further be seen that when in addition to the selection of the proper inductor assembly for heating one of the pin bearings, the inductor carriage 30 is positioned with the pawl 37 in one of the notches 36 for one of the pin bearings 20, 21, 22 and 23, one of the switches 44, 46, 47 and 49 will be closed and a circuit for the energization of relay 104 will thereby be completed.

Switch 75 is the inductor selection switch which is closed when the proper inductor assembly has been inserted in the inductor carrying assembly for the heating of main bearing 15. One side of the switch 75 is connected to power conductor 100 and the other side of switch 75 is connected by conductor 105 to one side of the indexing switch 43 for main bearing 15. The other side of switch 43 is connected by conductor 106 to one side of the coil of a relay 107. The other side of the coil of relay 107 is connected to power conductor 101. Relay 107 is provided with two sets of normally open contacts, relay contacts 107a in FIGURE 6 and relay contacts 107b in FIGURE 7. From the foregoing it may be seen that when the inductor carriage is properly positioned opposite main bearing 15 and the proper inductor assembly has been selected for heating main bearing 15, switches 75 and 43 will be closed to complete a circuit for the energization of relay 107 and the closing of relay contacts 107a and 107b.

In the present embodiment, one inductor assembly is used for heating the main bearings 16 and 17. Therefore the indexing switches for those main bearings, switches 45 and 48 respectively are connected on one side thereof in parallel to a conductor 108 and on the other side thereof in parallel to a conductor 109. Conductor 108 is connected to one side of switch 76 which is the switch which is closed when the proper inductor assembly has been selected for heating either of the main bearings 16 or 17. The other side of switch 76 is connected to power conductor 100. Conductor 109 is connected to one side of the coil of a relay 110. The other side of the coil of relay 110 is connected to power conductor 101. Relay 110 is provided with two sets of normally open contacts, relay contacts 110a in FIGURE 6 and relay contacts 110b in FIGURE 7. From the foregoing it may be seen that when the inductor carriage 30 is positioned for the heating of one of the main bearings 16 or 17, and the proper inductor assembly has been selected for heating those bearings, a circuit will be completed for the energization of relay 110 to close its contacts 110a and 110b.

Switch 77 is the inductor selection switch which is closed when the proper inductor assembly has been selected for the heating of main bearing 18, and switch 50 is the indexing switch which is closed when the carriage 30 has been properly indexed for heating main bearing 18. One side of the switch 77 is connected to power conductor 100 and the other side of switch 77 is connected by a conductor 111 to one side of the switch 50. The other side of the switch 50 is connected by a conductor 112 to one side of the coil of a relay 113. The other side of the coil of the relay 113 is connected to power conductor 101. Relay 113 is provided with two sets of normally open contacts, relay contacts 113a in FIGURE 6 and relay contacts 113b in FIGURE 7. From the foregoing it may be seen that when the inductor carriage is properly indexed for heating main bearing 18, and the proper inductor assembly has been selected for heating main bearing 18, a circuit will be completed for the energization of relay 113 to close its contacts 113a and 113b.

Switch 114 is the manual start switch and is spring biased to an open position. Switch 115 is the manual stop switch and is spring biased to a closed position. One side of switch 114 is connected to power conductor 100 and the other side thereof is connected to one side of switch 115. The other side of switch 115 is connected in parallel to one side of the switches 85 and 86. It should be noted that switches 85 and 86 have previously been described as carried on the standard 94 and thereby operated by the cam member 89 on one of the arms 55 when the inductor assembly is raised or lowered, and that switches 85 and 86 are so arranged that switch 86 is operated when the inductor assembly is moved downwardly past a certain point and the switch 85 is operated when the inductor assembly is moved upwardly past a certain point. It also may be noted that the switches 85 and 86 do not remain closed but are merely operated to momentarily close their contacts. The other side of the switches 85 and 86 are connected in parallel to a conductor 116 and a conductor 117. Conductor 117 is connected to a conductor 118 and to one side of the relay contacts 120a. The other side of the relay contacts 120a is connected to power conductor 100. Relay contacts 120a are one set of normally open contacts of a relay 120. In addition to the normally open contacts 120a, relay 120 is provided with the normally open contacts 120b shown in FIGURE 7. Conductor 118 is connected in parallel to one side of each of the relay contacts 104a, 107a, 110a and 113a and to one side of the coil of a relay 121. The other side of the coil of relay 121 is connected to power conductor 101. Relay 121 is provided with one set of normally open contacts, contacts 121a in FIGURE 7. The other side of relay contacts 104a is connected to one side of a timing motor 122. The other side of relay contact 107a is connected to one side of a timing motor 123. The other side of relay contacts 110a is connected to one side of a timing motor 124, and the other side of relay contacts 113a is connected to one side of a timing motor 125. The other side of each of the timing motors 122, 123, 124 and 125 is connected to power conductor 101. Timing motor 122 is provided with a set of closed contacts 122a which are opened after a predetermined time interval. Timing motor 123 is provided with a set of closed contacts 123a which are opened after a predetermined time interval. Timing motor 124 is provided with a set of normally closed contacts 124a which are opened after a predetermined time interval, and timing motor 125 is provided with a set of normally closed contacts 125a which are also opened after a predetermined time interval. Conductor 116 is connected to one side of the contacts 125a of timing motor 125. The other side of contacts 125a is connected to one side of contacts 124a of timing motor 124. The other side of contacts 124a is connected to one side of contacts 123a of timing motor 123, and the other side of contacts 123a is connected to one side of contacts 122a of timing motor 122. The other side of contacts 122a is connected to one side of the coil of relay 120. The other side of the coil of relay 120 is connected to power conductor 101.

From the foregoing it may be seen that if the start switch 114 is held operated until either one of the switches 85 or 86 is momentarily closed through an appropriate pivoting of the arms 55, a circuit for the momentary energization of relay 120 will be completed through the series connections of the timing motor contacts 122a through 125a. The relay 120 in operating and closing its contacts 120a will complete a locking or holding circuit for relay 120 which will hold relay 120 operated. The closing of the start switch 114 and one of the switches 85 and 86 will also complete a circuit for the energization of relay 121 and one of the timing motors 122 through 125 if one set of the relay contacts 104a, 107a, 110a or 113a is closed. The closing of relay contacts 120a also completes holding circuits for the relay 121 and one of the timing motors 122 through 125. The timing motors 122 through 125 are lapsed-time motors and will after a certain predetermined period of time open their contacts.

The circuits of FIGURE 6 further include a relay 127c in FIGURE 7. One side of the coil of relay 127 is FIGURE 6 and two sets of ganged contacts 127b and 127c in FIGURE 7. One side of the coil of relay 127 is connected to power conductor 101 and the other side of the coil is connected in parallel to one side of each of the switches 83 and 84. The other side of switch 83 is connected to power conductor 100. The other side of switch 84 is connected to one side of the relay contacts 127a, and the other side of the relay contacts 127a is connected to power conductor 100. From the foregoing it may be seen that if the switch 83 is momentarily closed through an appropriate pivoting of the arms 55, a circuit for the momentary energization of relay 127 will be completed through switch 83. The relay 127 in operating will close its contacts 127a to complete a locking or holding circuit for relay 127. Relay 127 will remain operated until switch 84 is momentarily opened through an appropriate pivoting of the arms 55.

In FIGURE 7, a source of excitation voltage for the electrical generator for the inductor is shown as connected across a pair of conductors 130 and 131. The generator for the inductor assembly 67 is indicated at 132 and comprises a field coil 132a and an armature 132b. The generator may be of any suitable type known in the art capable of delivering the relatively high power levels used in the invention. In one reduction-to-practice of the invention a 10,000 cycle generator capable of delivering 165 kilowatts was used. One side of the armature 132b of the generator 132 is connected to one side of relay contacts 121a. The other side of relay contacts 121a is connected to one side of the inductor coil 71 of inductor assembly 67. The other side of the inductor coil 67 is connected to the other side of the armature 132b of generator 132. A capacitor 133 is connected across coil 71.

One side of the field coil 132a of generator 132 is connected to one side of relay contacts 120b. The other side of relay contacts 120b is connected to conductor 130. The other side of the field coil 132a is connected in parallel to five resistors 135, 136, 137, 138 and 139. The resistors 135 through 139 are variable resistors having a movable arm for varying the effective resistance between the terminals thereof. The other side or terminal of resistor 135 is connected to one side of relay contacts 127b. The other side or terminal of resistor 136 is connected to one side of relay contacts 127c. The other side or terminal of resistor 137 is connected to one side of relay contacts 107b. The other side or terminal or resistor 138 is connected to one side of relay contacts 110b, and the other side or terminal of resistor 139 is connected to one side of relay contacts 113b. The other sides of the relay contacts 127b and 127c are connected in parallel to one side of relay contact 104b. The other sides of relay contacts 104b, 107b, 110b and 113b are connected in parallel to conductor 131. It may be seen that the variable resistors 135 through 139 are individually arranged for connection in series with the field coil 132a of the generator 132 to the generator excitation voltage. The resistors 135 through 139 are power resistors which by the voltage drops thereacross effectively determine the power which is to be delivered to the inductor coil 71 of the inductor assembly 67.

Although much of the operation of the present invention is apparent from the preceding description of the invention the hereinafter following description of operation will render the various construction and adjustment details more clear. Assuming firstly that a pin bearing is to be heated and that, for example, the pin bearing 22 is selected. It should be noted that the heating of the individual bearings of the crankshaft is made in a definite preselected order and is correlated to the quenching operation which forms an important part of any hardening procedure for a bearing. However, since the present invention is not concerned with the quenching operation, the description of the heating operation need not proceed in any definite order from bearing to bearing. When the inductor carriage 30 is properly positioned for heating of pin bearing 22, the pawl 37 will be disposed in the notch 36 opposite pin bearing 22, and the switch actuator 42 will have closed switch 47. When the proper inductor assembly 67 for the heating of pin bearing 22 is inserted in the channel members 66 of the supporting plate 65, the arm 80 will have closed switch 74. A previously described circuit for the energization of relay 104 will be completed, and relay 104 will operate to close its contacts 104a in FIGURE 6 and 104b in FIGURE 7. With the crankshaft 14 rotating at a constant speed, the operator may manually lower the inductor assembly 67 onto the pin bearing 22. It is apparent that with the crankshaft rotating, the pin bearing 22 will cause inductor assembly 67 to be translated upwardly and downwardly with some sidewise movement appearing as a pivoting of the support arms 63 relative to the links 60 about the axis of the pin assembly 62. The upward and downward translations of the inductor assembly 67 will result in a pivoting of the arms 55 about the axis of the pin assemblies 57 with the rearward portion of the arms 55 moving downwardly as the forward portion of the arms 55 move upwardly. The switches 85 and 86 individually function to control the starting of a heat cycle for the bearings. One or the other of the switches 85 and 86 is used in any one cycle, and which one is used is dependent upon when it is desired to initiate a heating cycle, when the inductor assembly 67 is moving upwardly or is moving downwardly. The switch 85 is momentarily operated when the rear portion of the arm 55 moves downwardly past switch 85 and switch 86 is momentarily operated when the rear portion of the arm 55 moves upwardly past the switch 86. The appropriate one of the switches 85 and 86 may be selected by adjustment of the cam member 89, or by some manual lockout of one of the switches 85 and 86 from the circuit shown in FIGURE 6. The selected one of the switches 85 and 86 is also adjusted on the standard 94 to select the exact rotational position of the pin bearings relative to the inductor assembly 67 at which it is desired that the heating cycle begin. In one reduction practice of the invention switch 86 was selected and positioned to initiate the heating cycle when the pin bearing was moving downwardly and when the pin bearing was 60° from its lowermost position. This reduction practice was in an arrangement wherein the coil 71 spanned a circumferential arc of the pin bearings of substantially 120° and the crankshaft 14 was rotated at a speed of 7 revolutions in 11½ seconds. Further, in that reduction practice the timing motor 122 was adjusted to open its contacts 11½ seconds after the initiation of the heating cycle. This arrangement provided for a heating cycle of 7 revolutions of the crankshaft and because of the circumferential size of the coil, substantially 30° of the circumference of the bearing on each side of a diameter parallel to the cheeks of the bearing and between the cheeks was heated for a period of time ⅐ greater than the period of time during which the remainder of the circumference of the bearing was heated. Assuming that the same arrangement is used in the present example, switch 86 will momentarily close every time the pin bearing 22 moves downwardly to a position substantially 60° from its lowermost position.

Before proceeding with the description of the operation of the present example, the functions and adjustments of the switches 83 and 84 are necessary. Switch 83 momentarily closes whenever the rearward portion of the arm 55 moves downwardly past switch 83. Switch 84 operates to momentarily open its contacts whenever the rearward portion of the arm 55 moves upwardly past switch 84. Switches 83 and 84 function to change the amount of power delivered to the inductor coil 71 for a certain portion of the circumference of the pin bearings. In the present example, switches 83 and 84 may be assumed to be positioned on the standard 90 so that switch 83 is operated to momentarily close its contacts when the rearward portion of the arm 55 moves downwardly past a point represented by an upward movement of the pin bearing 22 to a position substantially midway between the upward and downward limits of movement of the pin bearing 22, and so that the switch 84 is operated to momentarily open its contacts whenever the rearward portion of the arm 55 moves upwardly past a certain point represented by a downward movement of the pin bearing 22 to a position substantially between the upward and downward limits of translation of the pin bearing 22.

With the aforementioned assumptions existing, the operator may manually close the start switch 114. Nothing will occur until switch 86 is momentarily closed when pin bearing 22 in moving downwardly reaches a position substantially 60° from its lowermost position. At that time switch 86 will close to complete a circuit for the initial energization of relay 120. Relay 120 will operate to close its contacts 120a and 120b. The operator may then release the start switch 114 and relay 120 will remain operated over its lockup circuit through relay contacts 120a. Substantially simultaneously with the energization of relay 120, the timing motor 122 will begin its operation through an initial circuit including closed relay contacts 104a and switches 114 and 86, and through a holding circuit including contacts 104a and 120a. Relay 121 will also be similarly operated to close its contacts 121a to complete the generator armature circuit for delivering power to the inductor coil 71. At this time relay 127 is not energized and consequently the following circuit is completed for applying the generator excitation voltage to the generator field coil 132a; conductor 130, closed relay contacts 120b, field coil 132a, resistor 136, closed relay contacts 127c, closed relay contacts 104b, and conductor 131. Resistor 136 is adjusted to provide that substantially the high power level is applied to the generator field coil 132a. In one reduction-to-practice of the invention a high power level of 165 kilowatts was used. This high level of power will result in a rapid heating of the surface of the pin bearing 22 over the circumferential portion between the cheeks at each end of the pin bearing 22 and until the pin bearing 22 moves upwardly to substantially the midpoint of its upward and downward translations. At that point, switch 83 will be operated to momentarily close its contacts. The momentary closing of switch 83 will result in an initial energization of relay 127, and relay 127 in operating will close its relay contacts 127a and 127b and will open its relay contacts 127c. The closing of relay contacts 127a will complete a holding circuit for relay 127. The closing of relay contacts 127b and the opening of relay contacts 127c will substitute resistor 135 for resistor 136 in the field circuit of the generator 132. The resistor 135 is adjusted to provide a low power level for the inductor coil 71. In one reduction-to-practice of the invention a low power level of substantially 33 kilowatts was used. Thus it may be seen that as the pin bearing 22 moves through substantially the upper half of a revolution, when the inductor coil 71 is engaging the circumferential portions of the pin bearing 22 which are disposed outwardly of the portions of the cheeks extending toward the axis of rotation of the crankshaft, a substantially lower level of power is delivered to the inductor coil 71. When the pin bearing 22 again moves downwardly to a position substantially at the midpoint of its upward and downward translations, switch 84 will be momentarily operated to open its contacts. The momentary opening of switch 84 will break the holding circuit for relay 127, and relay 127 will restore opening its contacts 127a and 127b and closing its contacts 127c. Again, the high power level resistor 136 is inserted in the field circuit for the generator field winding 132a. The above described cycles will continue for seven revolutions of the crankshaft 14 or for a period of substantially 11½ seconds. At that time the timer motor 122 will operate to open its contacts 122a. The opening of contacts 122a will break the holding circuit for relay 120 and relay 120 will restore opening its contacts 120a and 120b. The opening of contacts 120a will cause the timing motor 122 and the relay 121 to restore. The closing of contacts of 122a when the timing motor 122 restores will have no effect at this time on relay 120 because of the open start switch 114 and the open relay contacts 120a. Relay 121 in restoring will open its contacts 121a to break the generator armature circuit. In the above described restoration of relays 120 and 121, relay contacts 120b are set to open slightly before relay contacts 121a to avoid excessive sparking across contacts 121a. The heating cycle for pin bearing 22 is then completed. Because of the varied power levels, the depth of heating of pin bearing 22 will be substantially uniform circumferentially thereof. The various physical constants relating to time and temperature which have been used in the foregoing description by way of example of one reduction-to-practice of the present invention must of course be correlated to the particular mass of the bearing being heated. It is believed sufficient to gain the understanding of one skilled in the art to merely describe the physical constants relating to the mass of a pin bearing which was used in the noted one reduction-to-practice and for the circumferential portion of that pin bearing when 165 kilowatts of power was delivered to the inductor. In that application of the invention, the journal portion of the bearing had a diameter of 2.375 inches and a width of 1.390 inches. The fillets at each end of the bearing which importantly were also heated by the inductor had a nominal radius of 11/64 of an inch. The effective heating of the fillets by the inductor extended radially outwardly of the journal surface a distance which was a nominal 0.180 inch. Calculating the respective areas, the results are that the journal area is 10.40 square inches and each fillet area is approximately 1.47 square inches. By adding the journal area to the area of both fillets, the total circumferential area is found to be approximately 13.3 square inches. If the input power of 165 kilowatts is divided by ⅓ of the total area, because of the inductor span of 120°, the average input power density will be found to be approximately 37.2 kilowatts per square inch, and it will be appreciated by one skilled in the art that this is a very high input power density for the heating of a pin bearing of a crankshaft. In the one noted reduction-to-practice, and with the described physical constants, the circumferential portion of the journal and fillets of the pin bearing between the cheeks was heated through substantially a uniform skin depth to a temperature immediately below that temperature which would cause overheating of the bearing. Of course it should be understood that although the average power density was 37.2 kilowatts per square inch, the power density in the layer inwardly of the fillet was substantially higher in order to provide the desired uniform depth of hardened pattern over the entire area of the journal and the fillets of the bearing. The described reduction-to-practice accomplished sufficient heating in the areas inwardly of the fillets to a uniform skin depth without overheating in any other portion of the bearing.

The operation of the invention for heating cycles of the other pin bearings occurs in substantially the same manner except that instead of switch 47 being operated, one of the other switches 44, 46 or 49 will be operated to complete a circuit for relay 104.

From the preceding description, it may be seen that the novel process of the invention has also been described. The first step in the process for hardening one of the pin bearings is to rotate the crankshaft at a certain speed, for example at a speed of seven revolutions in 11½ seconds. The second step is to apply an inductor to a circumferential portion of the pin bearing so that the entire circumference of the pin bearing is heated as the crankshaft rotates. As an example the inductor may span substantially 120° of the circumference of the pin bearing. The next step is to energize or deliver power to the inductor when the inductor reaches a certain position on the circumference of the bearing. Further, as the inductor is causing the surface of the pin bearing circumferentially thereof to be heated, the power level delivered to the inductor is varied to substantially control the temperature attained by the bearing substantially uniformly circumferentially thereof. By using a power level of 165 kilowatts over the circumferential portion of a pin bearing which is disposed between the portions of the cheeks which extend toward the axis of the crankshafts, and by using a power level of substantially 33 kilowatts over the remaining circumferential portion of the pin bearing, it has been found that a temperature, immediately below that temperature which causes overheating in the surface of the bearing, is attained in the surface of the pin bearing substantially at the trailing edge of the inductor coil when the pin bearing is dimensioned substantially as previously described. Because of the specific rotational speed of the crankshaft in relation to the input power density it has further been found that the temperature gradient from the surface of the bearing toward the axis thereof is extremely sharp thereby effectively resulting in merely skin-depth heating for hardening of the bearing. Because the core of the bearing is substantially not heated, it has been found that substantially no distortion occurs in the crankshaft. This skin-depth heating of the bearing extends not only over the journal portion thereof, but also uniformly through the fillets thereof. It has further been found that the temperature range in which the skin-depth heating occurs without distortion of the crankshaft and without hairline cracks in the surface of the pin bearing is between 1800° F. and 2400° F. The process is completed by deenergizing the inductor after a certain predetermined time. Excellent results are attained with the aforedescribed other physical constants when the period of the heat cycle is 11½ seconds so that the pin bearing of the crankshaft is heated during seven revolutions thereof.

In the heating of the main bearings 15, 16, 17 and 18 of the crankshaft 14, it may be seen that no operations of the switches 83 through 86 will occur because of no upward and downward translations of the main bearings during rotation of the crankshaft. With the proper indexing of the inductor carriage 30 for heating of one of the main bearings, and with the insertion of the proper inductor for heating the selected main bearing, one of the relays 107, 110 or 113 will be operated.

When one of those relays has operated, a circuit for the operation of one of the timing motors 123, 124 or 125 will be partially completed and a circuit for one of the power level resistors 137, 138 or 139 will also be partially completed. By suitable manual operations the start switch 114 and one of the switches 85 or 86 are momentarily operated to complete an initial energization circuit for relay 120. Relay 120 in operating will complete an operating circuit for the appropriate timing motor and will also complete the field circuit for the generator 132. Relay 120 in operating will also complete an operating circuit for relay 121, and relay 121 in operating will complete the armature circuit for the generator 132. The main bearing will then be heated as the crankshaft is rotated until the appropriate timing motor opens its contacts to cause relay 120 to restore. When relay 120 restores, the timing motor and relay 121 will also restore to break the generator circuits and thereby stop the heating cycle for the main bearing. Except for the change in power levels during each revolution of the crankshaft, the heating process for the main bearings is substantially similar to that of the pin bearings.

Dependent upon the mass of one of the main bearings in relation to the rotational speed of the crankshaft, the total heating period, the span of the inductor, the bearing may be heated through substantially a skin depth at the trailing edge of the inductor coil to a temperature immediately below that temperature which causes overheating in the surface of the bearing. Again, the temperature range will be between 1800° and 2400° F. and substantially no distortion of the crankshaft will appear.

It is evident from the description that the scope of the invention in regard to the heating of the pin bearings may be extended to provide for varied power levels in the heating of a particular main bearing by using the revolutions or translations of a pin bearing relative to the axis of the rotation of the crankshaft to control the power delivered to a main bearing.

Having described the invention what is considered new and desired to be protected by Letters Patent is:

1. In an apparatus for heating the bearings of a crankshaft, means for rotating said crankshaft about the axis of rotation thereof at a certain speed so that the pin bearings of said crankshaft revolve about the axis of rotation of said crankshaft, an inductor formed to span a certain circumferential portion of one of said bearings of said crankshaft to circumferentially heat said one bearing when applied thereto as said crankshaft rotates, means supporting said inductor in an applied relationship to said one bearing as said crankshaft rotates, and means operating responsive to the revolutions of one of the pin bearings of said crankshaft to modulate the power delivered to said inductor.

2. In an apparatus for hardening the pin bearings of a crankshaft, means for rotating said crankshaft, an inductor formed to span a certain circumferential portion of a pin bearing of said crankshaft to heat said portion when applied thereto, means supporting said inductor in an applied relationship to one of said pin bearings so that said inductor is translated toward and away from the axis of rotation of said crankshaft as said crankshaft is rotated, and means operating responsive to the translations of said inductor to vary the amount of power delivered to said inductor.

3. In an apparatus as defined in claim 2, and means correlating the variance of power delivered to said inductor with the circumferential variance in mass of crankshaft material at each end of said pin bearing to provide substantially uniform depth of heating about the entire circumference of said pin bearing.

4. In an apparatus for hardening the main bearings and the pin bearings of a crankshaft, inductor means adapted to heat a circumferential portion of said bearings when applied thereto, support means formed to apply said inductor means on said bearings under the influence of gravity so that said inductor means remains substantially stationary when applied to a main bearing as said crankshaft rotates and so that said inductor means is translated upwardly and downwardly when applied to a pin bearing as said crankshaft rotates, and means operating responsive to a substantially stationary position of said inductor means to deliver substantially constant power to said inductor means and operating responsive to translations of said inductor means to vary the amount of power delivered to said inductor means.

5. In an apparatus as defined in claim 4, and means correlating the variance in power delivered to said inductor means with the variance in mass of said crankshaft at each end of said pin bearing to provide substantially uniform depth of heating of said pin bearing about the entire circumference thereof.

6. In an apparatus for heating the pin bearings of a crankshaft, means for rotating said crankshaft about the axis of rotation thereof, an inductor formed to span a certain circumferential portion of a pin bearing of said crankshaft to heat said portion when applied thereto, a parallelogram arrangement of arms pivotally supported at one end thereof to carry said inductor in a depending relationship on the other end thereof so that said inductor engages and is gravitationally carried on one of said pin bearings, whereby said parallelogram of arms is pivoted and said inductor is translated toward and away from the axis of rotation of said crankshaft as said crankshaft is rotated, and means operating responsive to the pivoting of said parallelogram of arms to vary the amount of any power delivered to said inductor.

7. In an apparatus as defined in claim 6, and means operating responsive to the pivoting of said parallelogram of arms to a certain position for initiating the application of power to said inductor.

8. In an apparatus as defined in claim 7, said means operating responsive to the pivoting of said parallelogram of arms to vary the amount of any power delivered to said inductor comprising circuit means including a pair of switches carried in cooperation with said parallelogram of arms, and switch operating means on said parallelogram of arms for operating one of said switches when said parallelogram of arms is pivoted in one direction and for operating the other of said switches when said parallelogram of arms is pivoted in the other direction, said circuit means operating responsive to the operation of one of said switches to reduce the amount of any power delivered to said inductor from a certain level and operating responsive to the operation of the other of said switches to restore said reduced amount of any power to said certain level.

9. An apparatus as defined in claim 8, wherein said switches are formed and positioned relative to said switch operating means on said parallelogram of arms so that any period of reduced power delivered to said inductor coincides with the movement of said inductor over the circumferential portion of a pin bearing outwardly of the cheeks at each end of said pin bearing.

10. In an apparatus for heating the main and pin bearings of a crankshaft, means for rotating said crankshaft about the axis of rotation thereof, inductor means formed to span a certain circumferential portion of one of the main and pin bearings of said crankshaft to heat said portion when applied thereto, a parallelogram arrangement of arms pivotally supported at one end thereof to carry said inductor means in a depending relationship on the other end thereof, means for moving said parallelogram arrangement of arms longitudinally of said crankshaft to select a particular one of said main and pin bearings, whereby said inductor means engages and is gravitationally carried on the selected one of said main and pin bearings so that said parallelogram of arms remains substantially stationary when carried on one of said main bearings and so that said parallelogram of arms is pivoted and said inductor means is translated toward and away from the axis of rotation of said crankshaft when said inductor means is carried on one of said pin bearings as said crankshaft is rotated, power means connected to said inductor means for operation of said inductor means, and means operating responsive to the pivoting of said parallelogram of arms when said inductor means is carried on one of said pin bearings to vary the amount of any power delivered to said inductor means.

11. In an apparatus as defined in claim 10, said last mentioned means being carried relative to said parallelogram of arms to vary the amount of any power delivered to said inductor means to substantially reduce the power when said inductor means engages the circumferential portion of any pin bearing outwardly of the cheeks at each end of said pin bearings.

12. In an apparatus for inductively heating the bearings of a crankshaft, means supporting said crankshaft for rotation about the axis of said crankshaft, an inductor carriage movably carried for manual positioning of said inductor carriage opposite any selected one of the bearings of said crankshaft, an inductor movably carried on said inductor carriage and manually movable for application to any one of said bearings opposite which said inductor carriage is positioned, power means for said inductor, and control circuit means operating to prevent application of said power means to said inductor provided said inductor carriage is not accurately positioned opposite any selected one of said bearings.

13. In an apparatus for heating the bearings of a crankshaft, means supporting said crankshaft for rotation of said crankshaft about the axis of rotation thereof, an inductor carriage carried for movement along a line parallel to the axis of rotation of said crankshaft, an inductor assembly carried on said inductor carriage and manually movable to engage the one of said bearings of said crankshaft opposite of which said inductor carriage is selectively positioned, a fixed member carried parallel to the axis of rotation of said crankshaft, a plurality of notches formed in said fixed member, each of said notches being positioned opposite one of said bearings, detent means carried on said inductor carriage and adapted to engage any selected one of said notches to accurately position said inductor carriage opposite a selected one of said bearings, a plurality of switches, each of said switches carried on said fixed member in cooperation with one of said notches, means carried on said detent means for operating one of said switches when said detent means engages the notch in cooperation therewith, power means for said inductor assembly, and circuit means connecting said plurality of switches to said power means and operating to prevent the application of said power means to said inductor assembly when said inductor carriage is not accurately positioned opposite the selected one of said bearings.

14. In an apparatus for inductively heating the bearings of a crankshaft, means supporting said crankshaft for rotation of said crankshaft about the axis thereof, an inductor carriage movably carried for positioning opposite any selected one of the bearings of said crankshaft, an inductor-supporting frame movably carried on said inductor carriage and adapted to receive and support different inductor assemblies, so that any inductor assembly supported by said inductor-supporting frame is movable into engagement with the one of said bearings opposite of which said inductor carriage is positioned, power means for any inductor assembly supported by said inductor-supporting frame, and means operating responsive to the particular inductor assembly supported by said inductor-supporting frame for preventing the application of said power means to any inductor assembly supported by said inductor-supporting frame unless a certain predetermined inductor assembly for said one of said bearings is supported by said inductor-supporting frame.

15. In an apparatus for inductively heating the bearings of a crankshaft, means supporting said crankshaft for rotation of said crankshaft about the axis thereof, an inductor carriage movably carried for positioning opposite any selected one of the bearings of said crankshaft, an inductor-supporting frame movably carried on said inductor carriage and adapted to receive and support different inductor assemblies so that any inductor assembly supported by said inductor frame is movable into engagement with the one of said bearings opposite of which said inductor carriage is positioned, a plurality of different inductor assemblies, each of said different inductor assemblies having different switch operating means, power means for any inductor assembly supported by said inductor-supporting frame, a plurality of switches carried on said inductor-supporting frame and cooperating with said different inductor assemblies so that different ones of said switches are operated by the switch operating means of different ones of said inductor assemblies, and circuit means operating responsive to the operation of a particular one of said switches for preventing the application of said power means to any inductor assembly supported by said inductor-supporting frame unless a certain predetermined inductor assembly for said one of said bearings is supported by said inductor-supporting frame.

16. In an apparatus for inductively heating the bearings of a crankshaft, means supporting said crankshaft for rotation about the axis thereof, an inductor carriage movably carried for positioning opposite any selected one of the bearings of said crankshaft, an inductor-supporting frame movably carried on said inductor carriage and adapted to receive and support different inductor assemblies, so that any inductor assembly supported by said inductor-supporting frame is movable into engagement with the one of said bearings opposite of which said inductor carriage is positioned, power means for any inductor assembly supported by said inductor-supporting frame, control circuit means operating to prevent application of said power means to any inductor assembly supported by said inductor-supporting frame unless said inductor carriage is accurately positioned opposite a selected one of said bearings, and other control circuit means operating responsive to the particular inductor assembly supported by said inductor-supporting frame for preventing the application of said power means to any inductor assembly supported by said inductor-supporting frame unless a certain predetermined inductor assembly for said one of said bearings is supported by said inductor-supporting frame.

17. In an apparatus for heating the bearings of a crankshaft, means for rotating said crankshaft about the axis of rotation, so that the pin bearings of said crankshaft revolve about the axis of rotation of said crankshaft, an inductor formed to span a certain circumferential portion of one of said bearings of said crankshaft to circumferentially heat said one bearing when applied thereto as said crankshaft rotates, means supporting said inductor in an applied relationship to said one bearing as said crankshaft rotates, and means operating responsive to the revolutions of one of the pin bearings of said crankshaft to modulate the power delivered to said inductor.

References Cited by the Examiner

UNITED STATES PATENTS

| | | | |
|---|---|---|---|
| 2,202,759 | 5/1940 | Denneen et al. | 219—10.43 |
| 2,256,947 | 9/1941 | Lewis | 148—154 |
| 2,623,836 | 12/1952 | Noren | 148—150 |
| 2,787,566 | 4/1957 | Seulen et al. | 148—146 |
| 2,794,894 | 6/1957 | Tudbury | 219—10.57 |
| 2,852,650 | 9/1958 | Coriolis et al. | 219—10.67 |
| 3,174,738 | 3/1965 | Seulen et al. | 148—154 X |

DAVID L. RECK, *Primary Examiner.*

W. B. NOLL, O. D. MARJAMA, C. N. LOVELL,
*Assistant Examiners.*